United States Patent [19]

Dyer

[11] 4,122,498

[45] Oct. 24, 1978

[54] EVENT DATA RECORDING APPARATUS WITH DIGITALLY ENCODED TIME AND DATE

[75] Inventor: Robert E. Dyer, Springfield, Ill.

[73] Assignee: Sangamo Electric Company, Springfield, Ill.

[21] Appl. No.: 795,906

[22] Filed: May 11, 1977

Related U.S. Application Data

[63] Continuation of Ser. No. 610,155, Sep. 4, 1975, abandoned.

[51] Int. Cl.² .............................................. G11B 5/00
[52] U.S. Cl. .......................................... 360/6; 346/20; 346/37
[58] Field of Search ............... 360/6; 346/20, 37, 146; 58/148, 152 R

[56] References Cited

U.S. PATENT DOCUMENTS

| | | | |
|---|---|---|---|
| 2,660,507 | 11/1953 | Cordell | 346/37 |
| 3,376,551 | 4/1968 | Armbruster | 346/146 |
| 3,591,731 | 7/1971 | Stancil | 360/6 |
| 3,657,488 | 4/1972 | Pountney | 346/20 |
| 3,869,707 | 3/1975 | Cupp | 360/6 |
| 3,913,129 | 10/1975 | Snyder | 360/6 |

*Primary Examiner*—Jay P. Lucas
*Attorney, Agent, or Firm*—Emrich, Root, O'Keeffe & Lee

[57] ABSTRACT

A data recording apparatus including a data recording circuit for recording event data provided by a data source on a first track of a magnetic tape and a time recording circuit which effects the recording of time reference data for the event data on a second track of the tape, the time recording circuit including a digital clock which provides encoded data representing month, day, hours and minutes for recording on the tape and an identification data source which provides encoded data representing an identification number for the data source for recording on the tape, the time and identification data being recorded on the tape in a biphase format.

31 Claims, 13 Drawing Figures

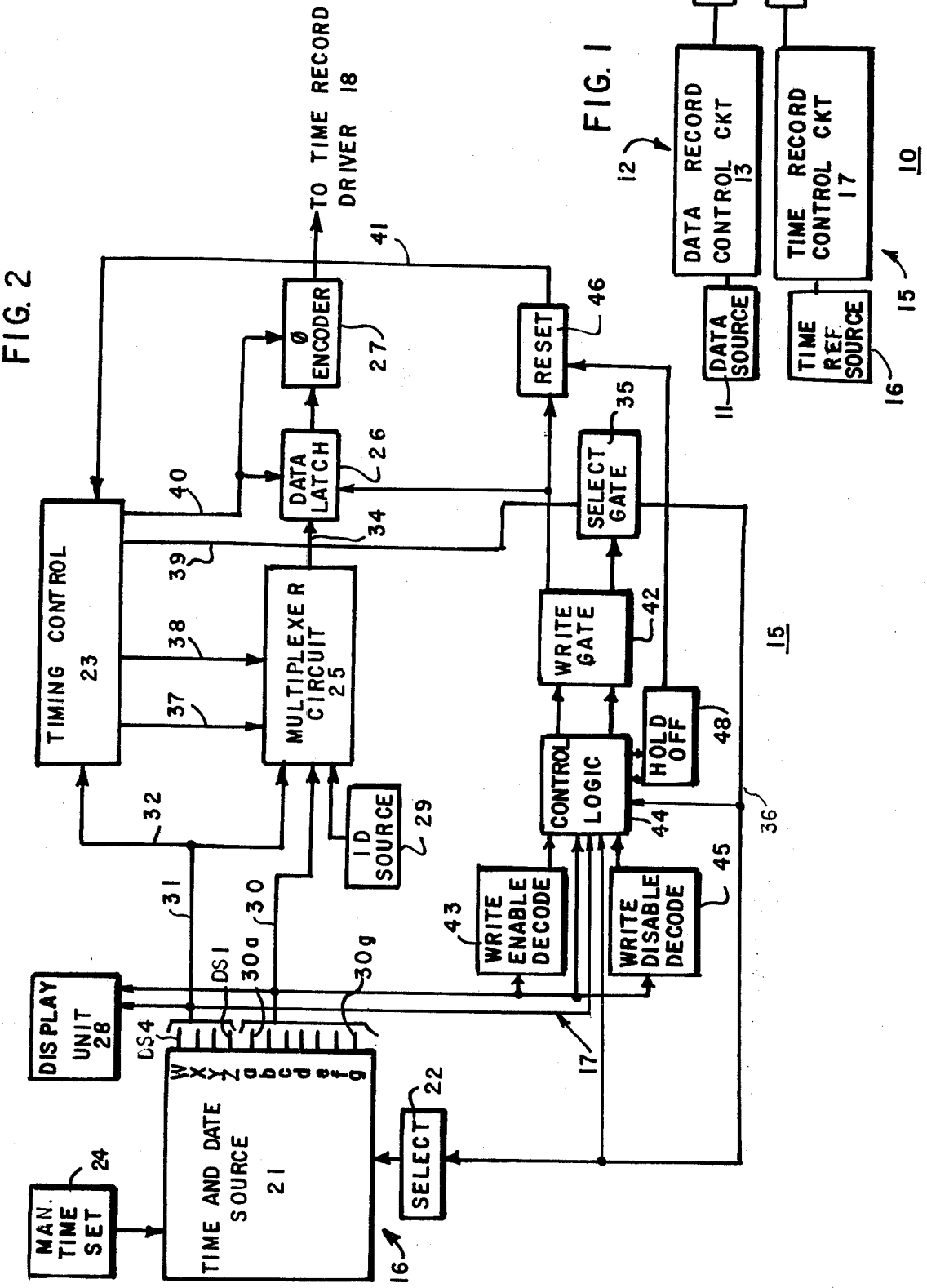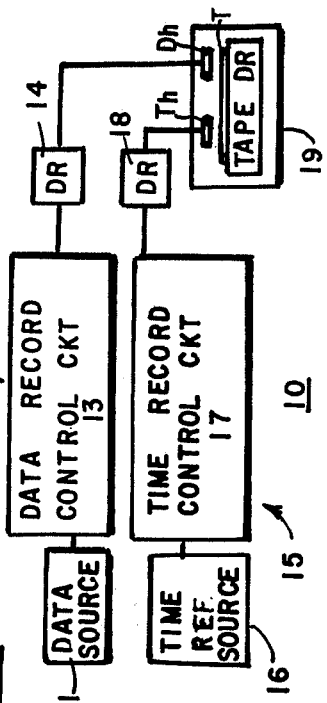

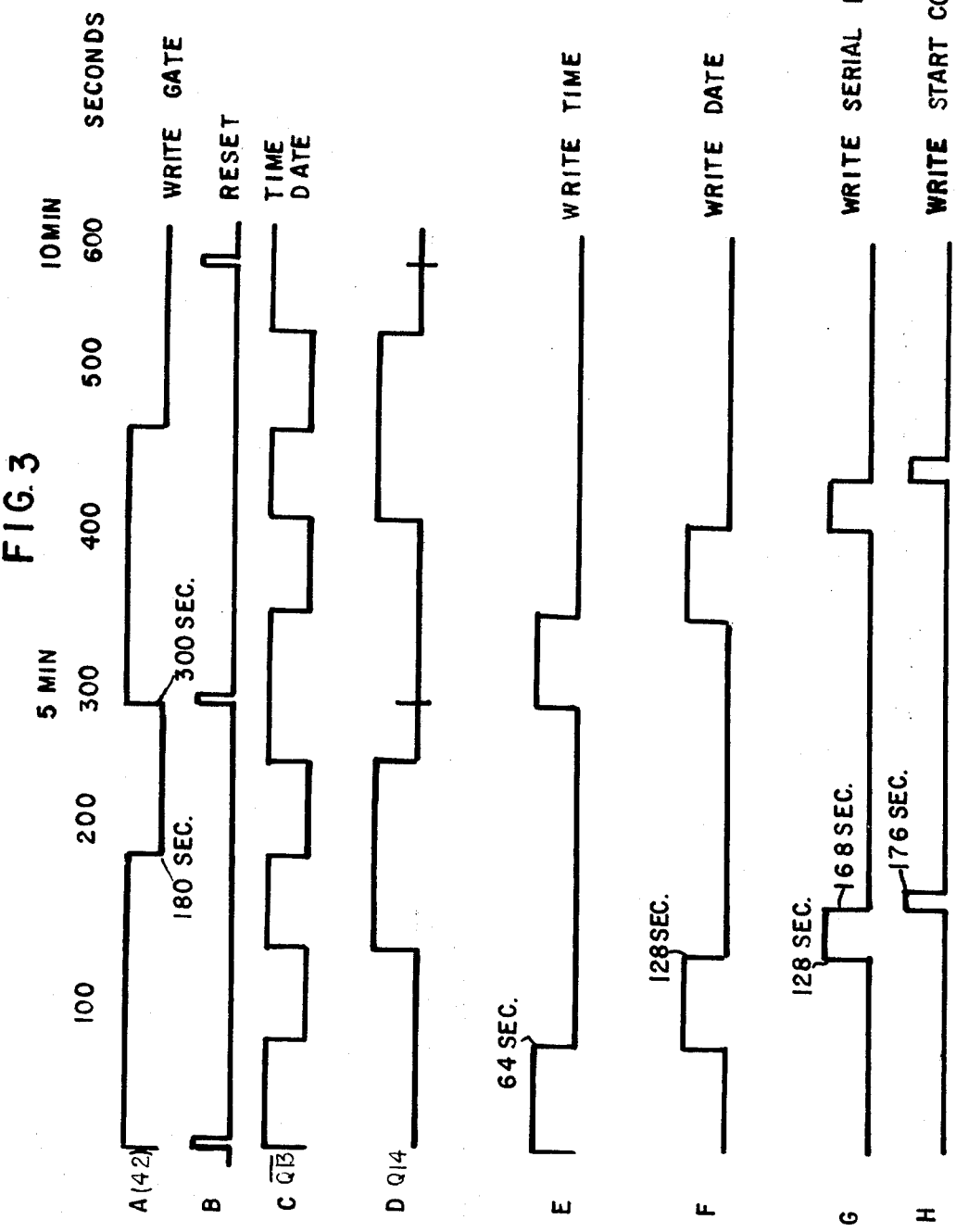

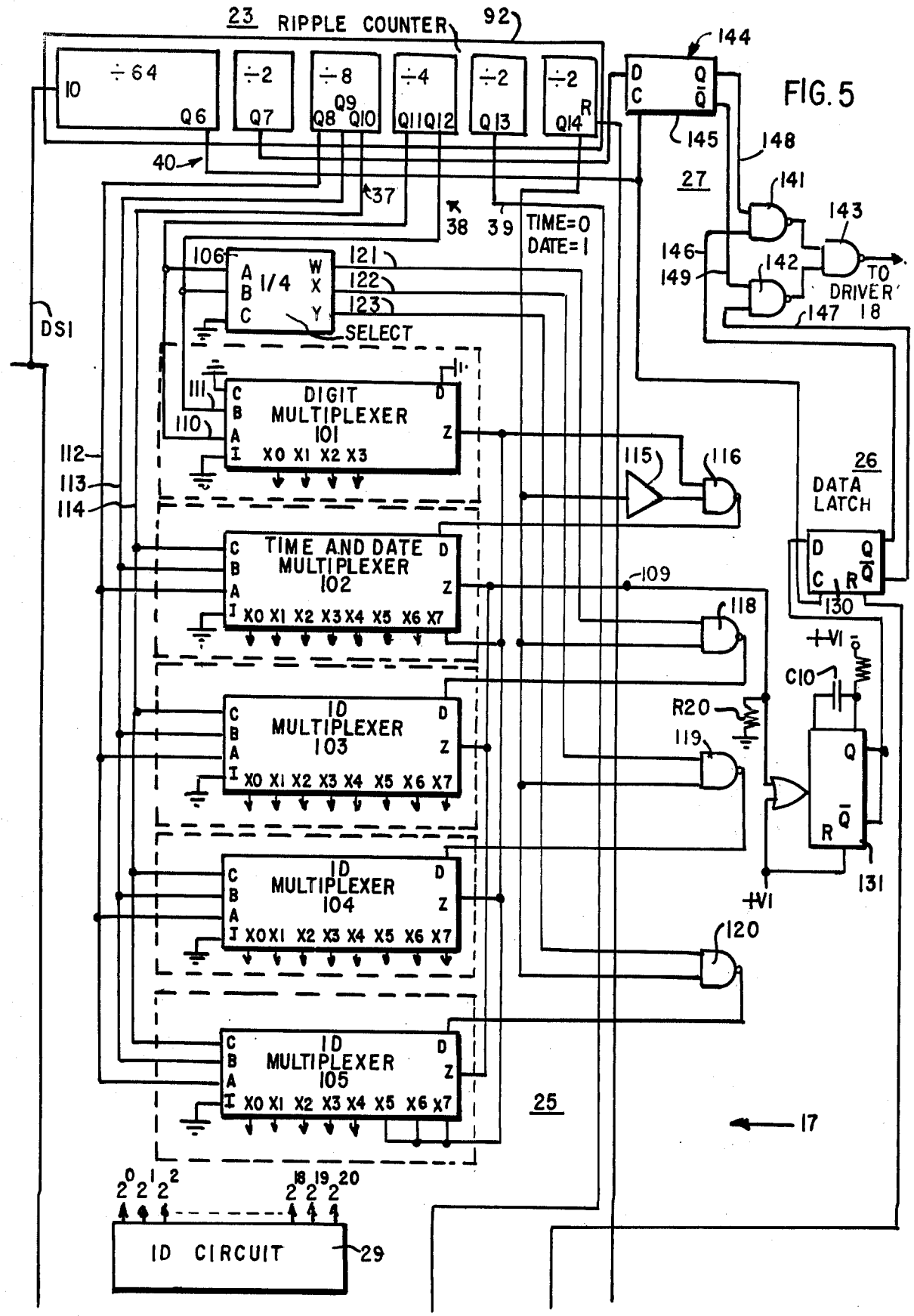

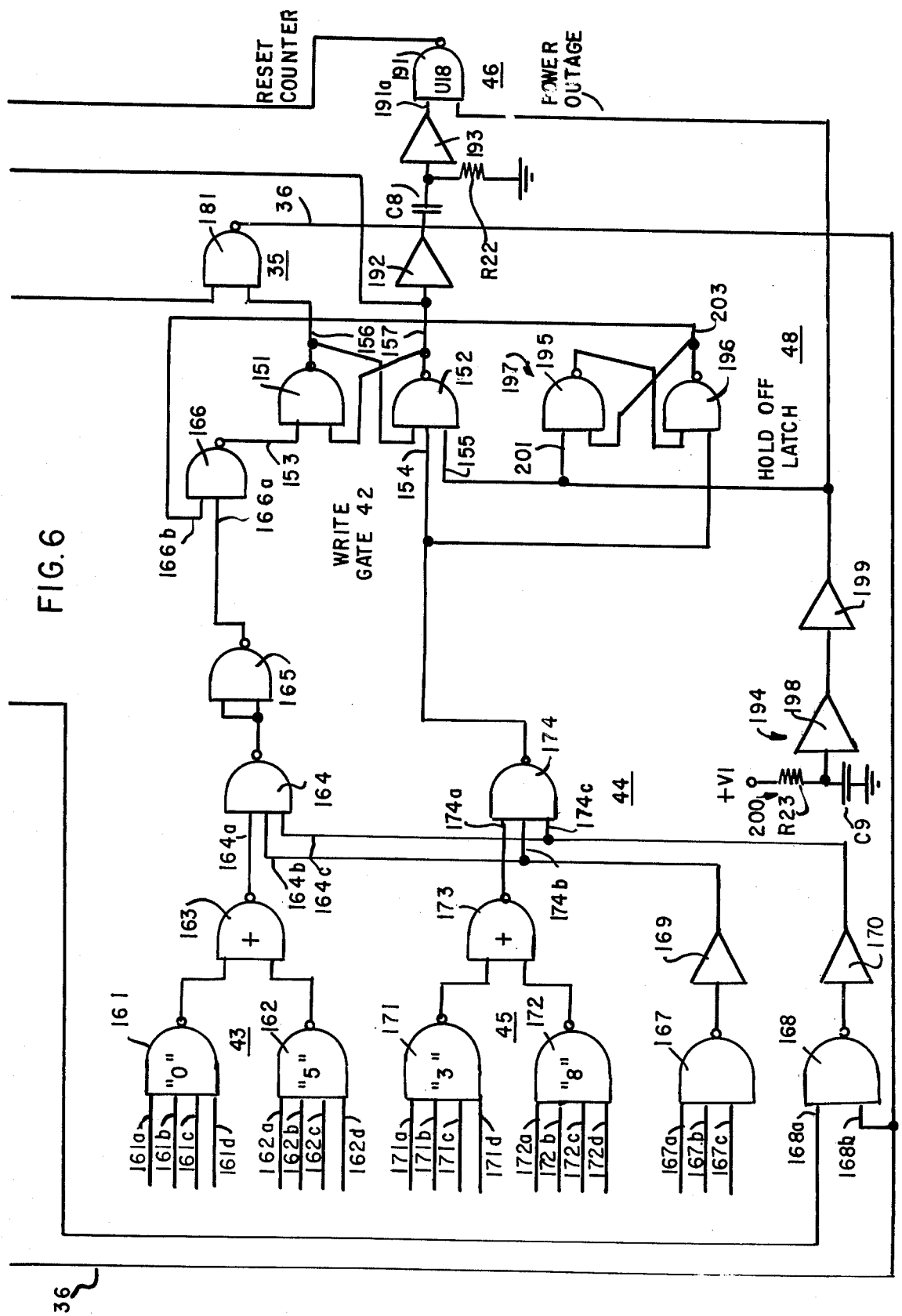

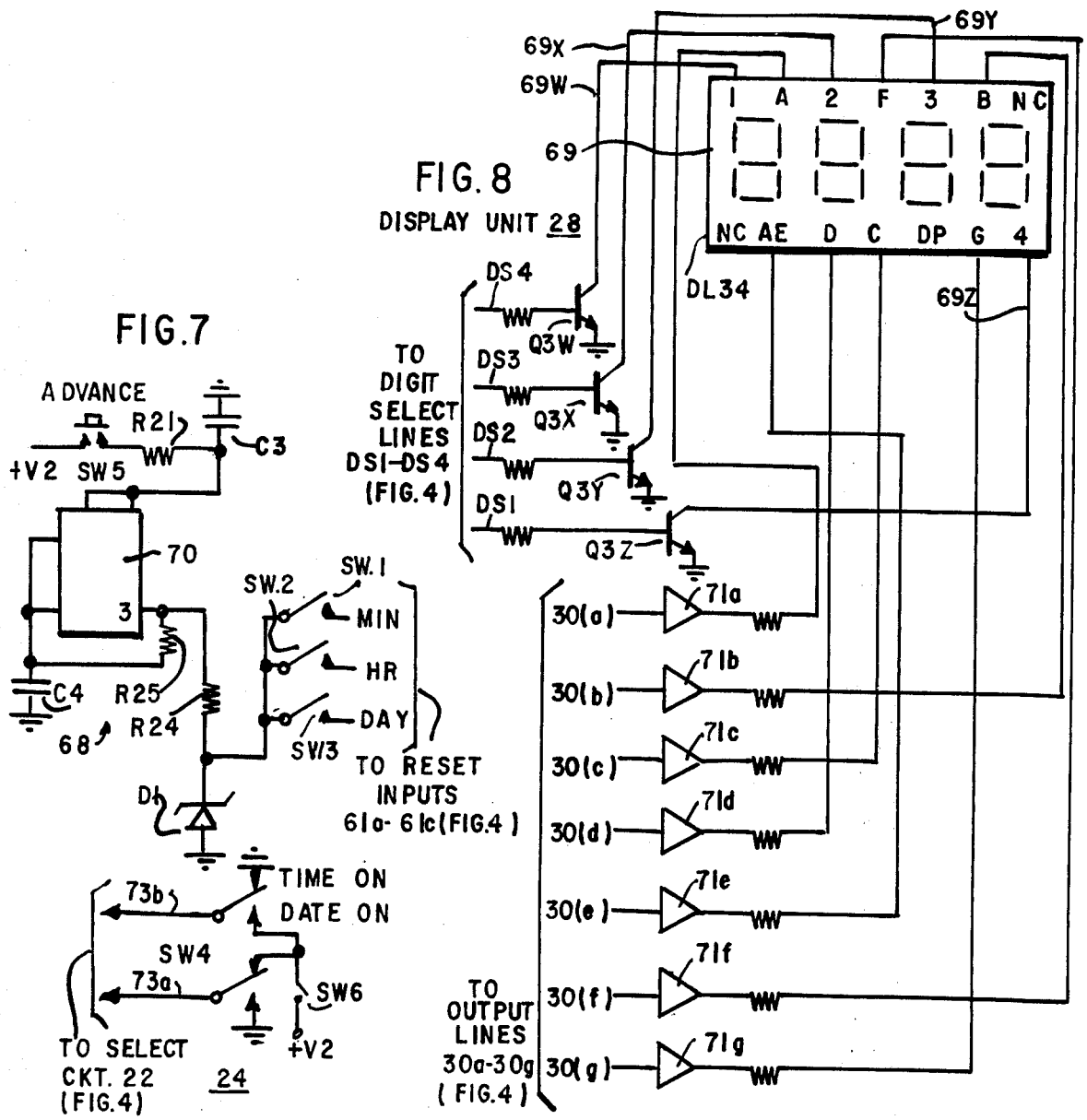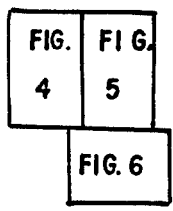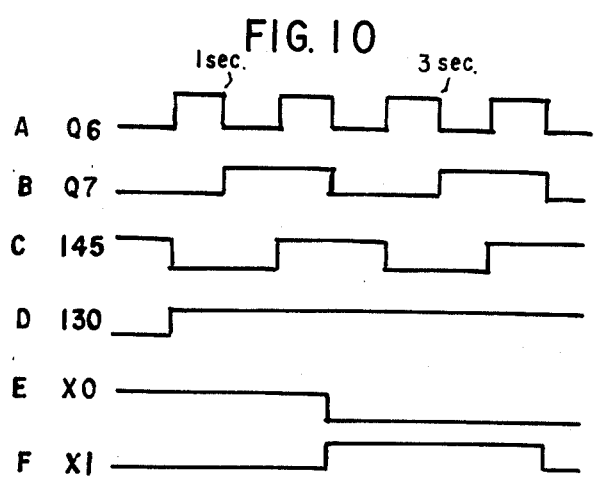

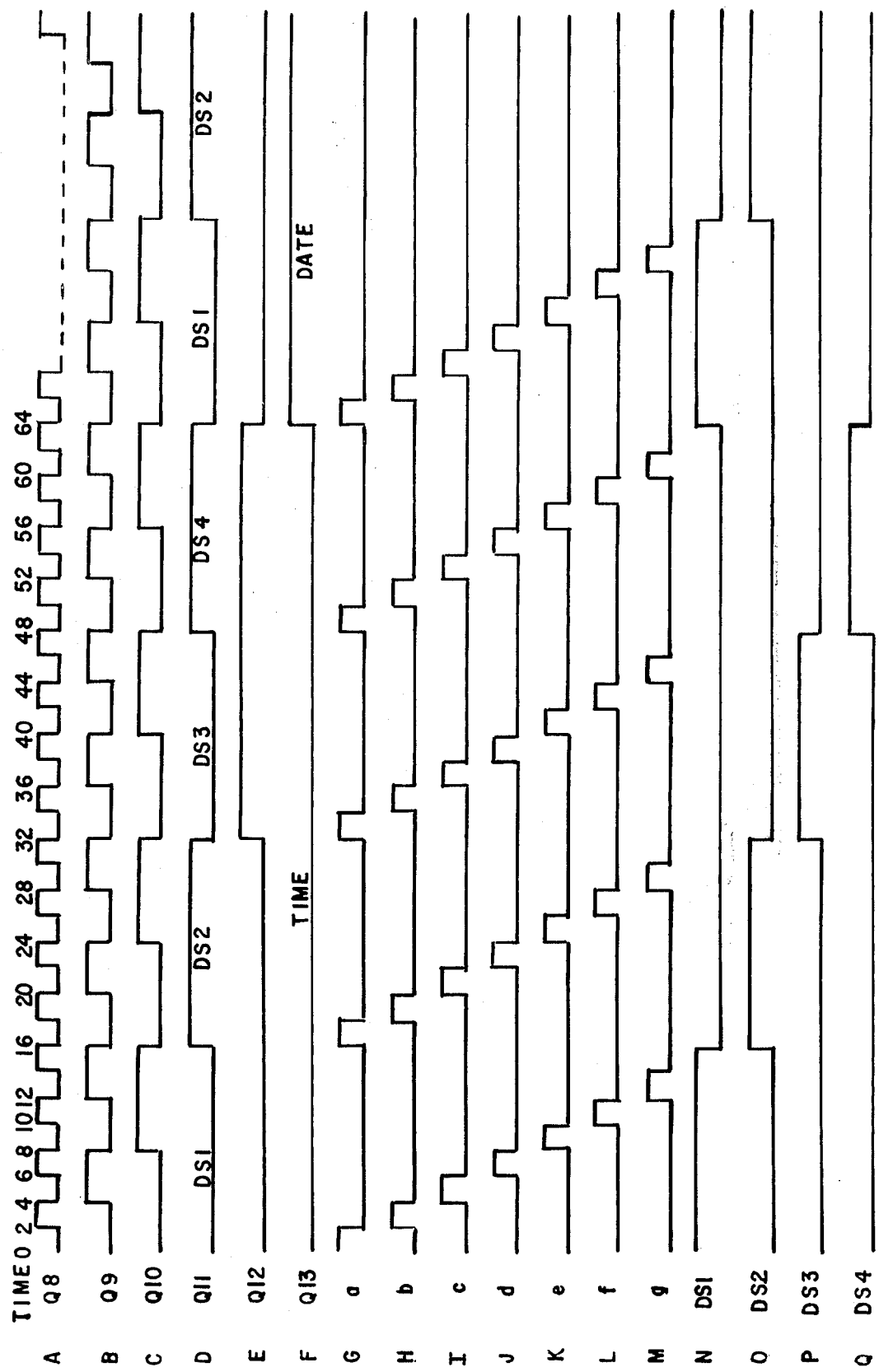

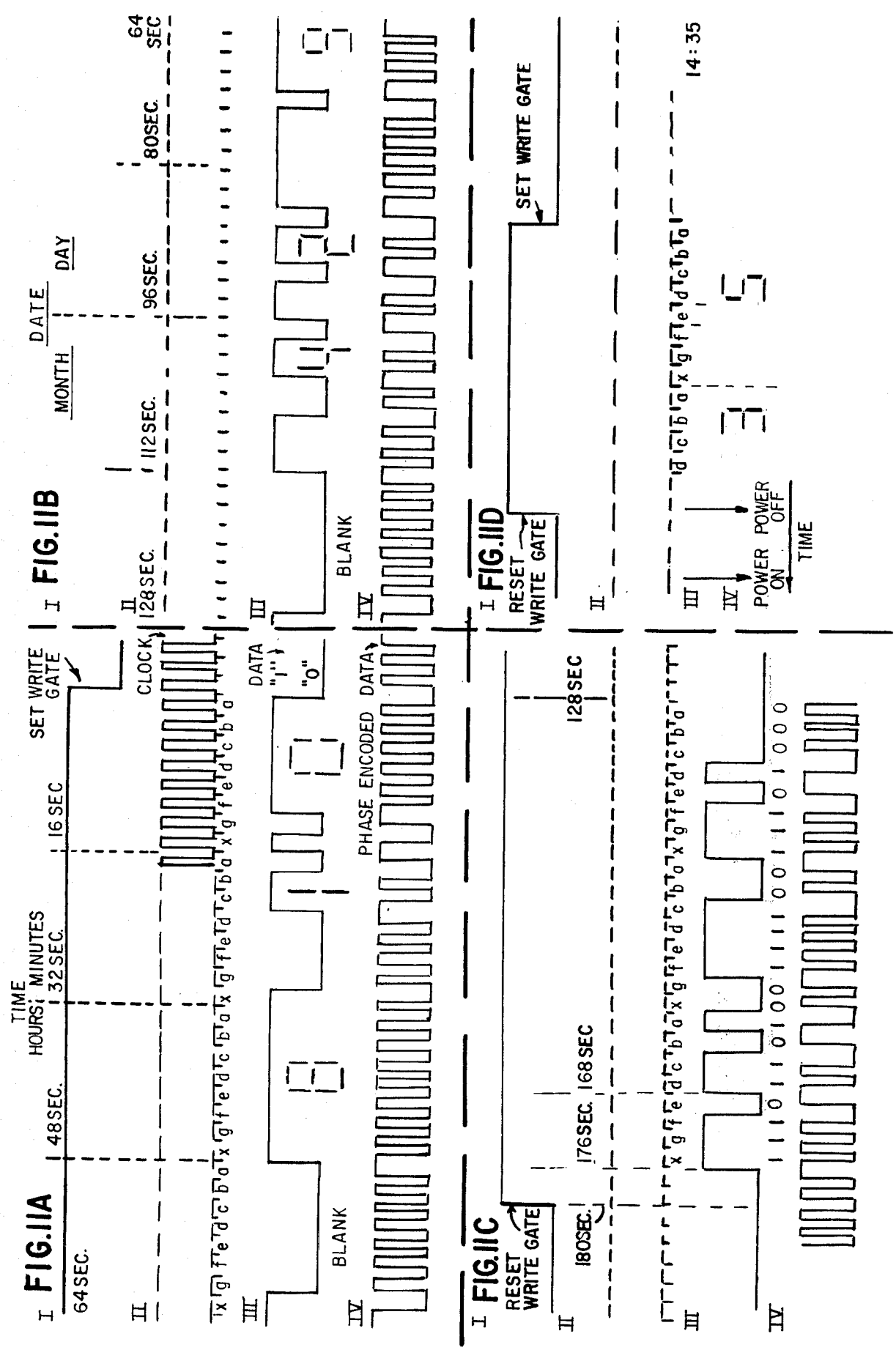

EVENT DATA RECORDING APPARATUS WITH DIGITALLY ENCODED TIME AND DATE

This is a continuation, of application Ser. No. 610,155, filed Sept. 4, 1975 now abandoned.

BACKGROUND OF THE INVENTION

1. Field of the Invention

This invention relates to data recording apparatus, and more particularly, to a multi-channel data recorder apparatus for recording event data and encoded time and date information to provide a time reference for the event data.

2. Description of the Prior Art

Many types of data recording apparatus are employed to record event data for various purposes. Examples of such data recording apparatus include load survey recorders, billing recorders, or the like which are employed by the utility industry to obtain data for use in customer study analysis, load surveys, load monitoring, automatic billing, data collecting and the like. In such recorders, it is generally desirable to provide a time reference for the recorded data.

One such survey recorder disclosed in the U.S. Pat. No. 3,829,772 to Normal F. Marsh et al., entitled "Load Survey Recorder for Measuring Electrical Parameters", comprises a two-track cassette recorder including recorder circuitry having a data recorder section which is responsive to input pulses representing a measurement for recording data pulses on a first track of a magnetic tape, and a time recorder section which is responsive to timing pulses to record time data on the second track of the tape to identify predetermined time intervals in which data recording occurs. The data relating to a load measured by the utility meter along with the time reference is recorded on the tape in a form which is compatible for use with available data processing equipment.

At a time determined by the nature of the usage of the equipment, the cassette tape is removed from the survey recorder and returned to a processing center where the tape is played back over tape processing equipment to retrieve the recorded information which may be supplied to a computer for processing.

In the patented survey recorder, timing pulses are recorded on the tape at predetermined intervals, such as at one pulse every fifteen minutes. Accordingly, when the load survey data is processed, the reference timing pulses must be converted to "real time" to determine the demand intervals at selected hours of a given day. Since the tape cassettes employed in such survey recorders typically record data for a period of approximately one month, it is evident that the conversion of the time reference to a given day, or to a given hour of the day is difficult and time consuming.

Also, while the patented system provides data which is compatible for use with available data processing equipment and permits printout of the recorded data in a conventional computer print out, in some instances, it may be desirable to provide a visual display of the data as the data is being processed.

A further consideration is identification of the data source. Normally, an identifying code such as the serial number of the utility device being monitored is hand written on the cassette cartridge to identify the utility device which provided the data when the recorded cassette is returned to a processing center. In the event the tape cassette is not marked to identify the utility meter, it may be impossible to determine the source of the data being processed.

Therefore, it would be desirable to have a data recording apparatus which provides a more precise time reference for recorded event data. It would also be desirable to have a data recording apparatus which records data in a format which is suitable for driving a conventional display apparatus, such as a segmented light emitting diode display unit. It would also be desirable to have a data recording apparatus which automatically records an identification number for the source of the recorded event data.

SUMMARY OF THE INVENTION

It is therefore, an object of the present invention to provide a data recording apparatus which provides a time reference for recorded data which includes encoded time of day and calendar data information.

Another object of the invention is to provide a data recording apparatus which records timing pulses and coded data on a recording medium in a biphase format.

Another object of the invention is to provide a data recording apparatus for recording event data which automatically records an identification number for the recording apparatus.

Yet another object of the invention is to provide a data recording apparatus for recording event data and a time reference for the event data on a magnetic tape wherein the time reference data is encoded in a form suitable for driving a conventional display apparatus.

A further object of the invention is to provide a data recording apparatus wherein data recording intervals are identified at predetermined invervals by the hour and the minute of a given day as well as the month and the day of the month, and which does not require setting at the end of each month.

These and other objects are achieved by the present invention which has provided a data recording apparatus for recording event data and a time reference on a recording medium. The data recording apparatus includes data record means responsive to data pulses representing event data to record the event data on the recording medium, and a time reference means operable to record time reference data, including timing pulses and time of day and calendar date information on the recording medium. The time of day information includes encoded data representing two digits for hours and two digits for minutes, and the calendar data information includes encoded data representing two digits for months and two digits for days. The time reference data means also effects the recording of an identification number on the recording medium for identifying the data recording apparatus.

The time reference data means includes a time data source means operable in a time mode to provide the time of day data and operable in a data mode to provide the calendar date data. A multiplexing means extends the data outputs of the data source means to an output data means which is operable when enabled to convert the data outputs extended thereto to a form suitable for recording on the recording medium. A timing control means effects the selection of the operating mode for the data source means and provides timing pulses for controlling the operation of the multiplexing means and the output means.

In accordance with a disclosed embodiment, the time data source means comprises an integrated circuit digital clock module which is operable in a time mode to provide four coded output words representing two digits for hours and two digits for minutes. The clock module is operable in a date mode to provide four coded output words representing two digits for month and two digits for day.

The timing control means provides timing pulses which define a first recording interval during which time the four output words representing time of day data are transferred in sequence from the clock module to the output data means to effect the recording of the data on the recording medium. Thereafter, the timing control means provides timing pulses which define a second recording interval during which time the calendar date data is written on the recording medium. The identification data is recorded on the recording medium during a further recording interval under the control of the timing control means.

For the purpose of enabling the time reference data to be recorded on the recording medium at predetermined intervals, the output data means is enabled and disabled under the control of an enable decoder means which responds to the coding for the minutes units digit when the digital clock module is operating in the time mode. Thus, for example, to effect the recording of the time reference data at five minute intervals, the enable decoder means responds to the codings for the digits 0 and 5 to enable the output data means and responds to the codings for the digits 3 and 8 to disable the output data means.

The enable decoder means also includes a hold off means operable to prevent the enabling of the output data means for a predetermined time in the event of a loss of power. Upon restoration of power, the hold off means inhibits the enabling of the output data means until such time as the coding for a digit 3 or 8 is provided by the clock module at which time the enable decoder means maintains the output data means disabled until the minutes unit digit becomes an 0 or a 5.

The output data means includes phase encoding means which effects the recording of each data bit in a bi-phase format to enable a time reference for the event data to be derived from the encoded data when the data is processed. The phase encoding means is controlled by the timing control means to effect the recording of biphase timing pulses on the recording medium during intervals when time and date date is not being recorded. The use of bi-phase recording enables a time base to be derived from the encoded data and timing pulses, permitting reconstruction of the encoded data when the data is recorded on a single track. In addition, in the exemplary embodiment, biphase signals are continuously recorded on the recording medium at a predetermined rate, which may, for example, provide a two second time base. Therefore, any demand interval, two seconds or greater, may be utilized to provide a time reference for the event data recorded on the recording medium.

Thus, the time reference recording means of the present invention enables the recording of a more precise time reference for the event data in that the time reference may be provided at two second intervals, for example, and includes coded data representing both time and date. The time information includes a four digit representation of hours and minutes, and the date information includes a four digit representation for month and day.

Moreover, the time and date information are provided in a format suitable for driving a conventional light emitting diode display apparatus, such that the time and date information can be displayed visually as the information is provided by the clock module. The clock module provides uninterrupted time representations, and automatically compensates for leap years. Thus, there is no need to reset the many units which may be employed at various locations. The provision of a display unit is particularly useful on start up, when the clock module may have to be set to provide the current time and date. Also, the feature of automatically recording an identification number for the recording apparatus on the recording medium assures proper identification of the event data that is recorded on the recording medium.

DESCRIPTION OF THE DRAWINGS

FIG. 1 is a block diagram for a data recorder apparatus provided by the present invention;

FIG. 2 is a block diagram of a time recorder circuit of the data recorder apparatus of FIG. 1;

FIG. 3 is a timing diagram for the time recorder circuit shown in FIG. 2;

FIGS. 4–6 when assembled as shown in FIG. 12 show a partial block and schematic circuit diagram for the time recorder circuit of FIG. 2;

FIG. 7 is a schematic circuit diagram for a manual time set circuit employed in the time recorder circuit;

FIG. 8 is a schematic circuit diagram for a display unit for use with the time recorder circuit;

FIG. 9, consisting of $a$ through $q$, is a timing diagram for the time recorder circuit;

FIG. 10 is a timing diagram for a phase encoder circuit of the time recorder circuit;

FIGS. 11A–11D show the time reference data format for the data recording apparatus; and, FIG. 12 shows how FIGS. 4–6 are to be assembled.

DESCRIPTION OF A PREFERRED EMBODIMENT

Figure 4:
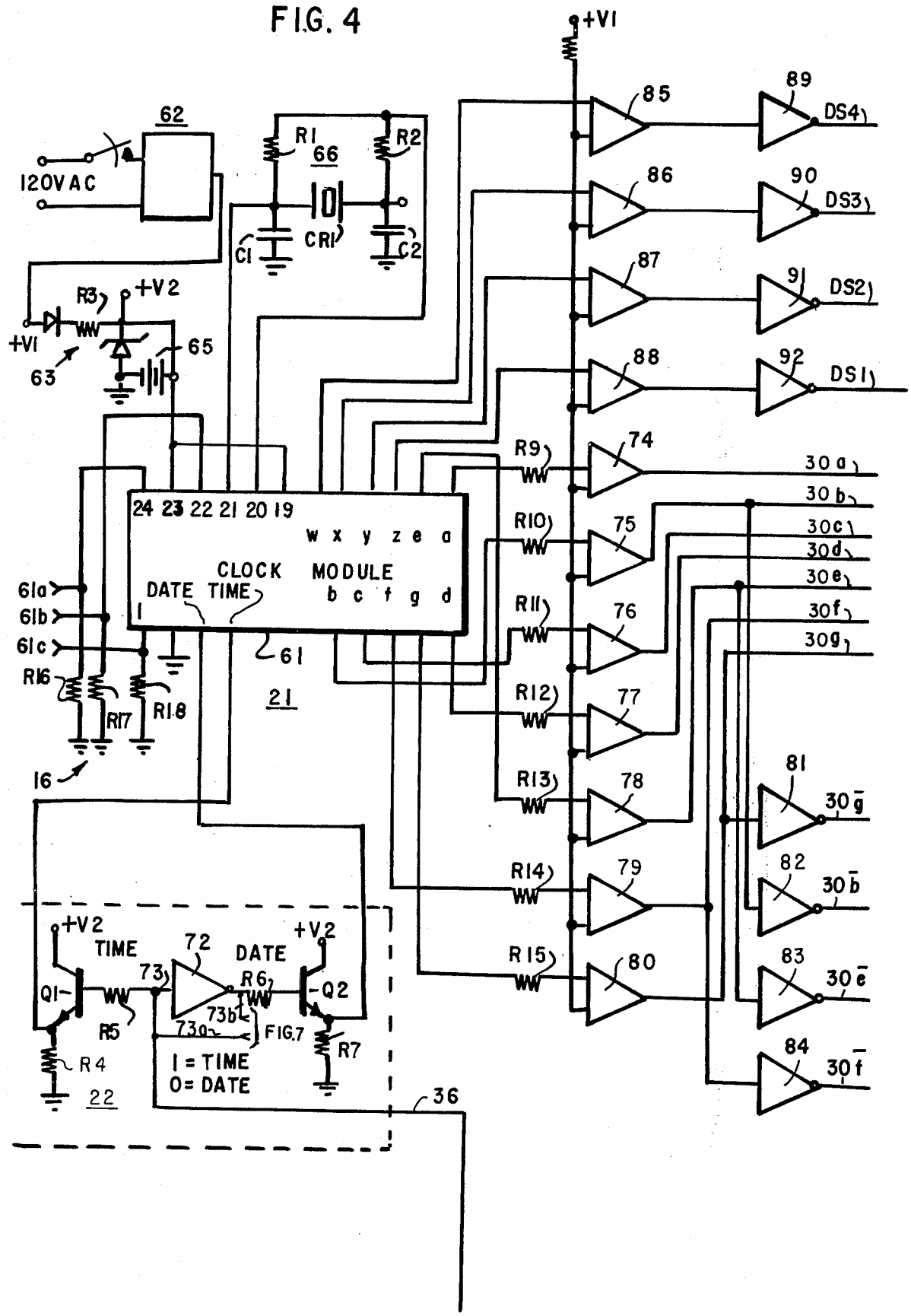

Referring to the drawings, FIG. 1 is a block diagram of a data recording apparatus 10 provided by the present invention which is operable to provide a magnetic tape recording of event data along with a time reference for indicating predetermined time intervals in which event data recording occurs. The data recording apparatus 10 may include a cassette-type tape supply (not shown) and may employ a time record head T$h$ and a data record head D$h$ to provide two-track recording of time and event data. It is apparent that a greater number of recording tracks may be provided through the inclusion of additional recording heads to permit a plurality of event data tracks, all referenced to a common time track to aid in recovery of the data.

In the exemplary embodiment wherein two-track recording is employed, the data head D$h$ is energized by an associated data recording circuit 12 to record data pulses representing event data on a first track of a magnetic tape T as the tape T is advanced past the data record head D$h$ by a suitable tape transport apparatus 19. The time record head T$h$ is energized by an associated time recording circuit 15 which records the time reference data on a second track of the tape T. In the exemplary embodiment, event data is recorded on the tape in a non-return-to-zero format and the reference data is recorded on the tape in a bi-phase format to permit a clock signal to be derived from the recorded time reference data when the data is processed.

The data recording apparatus 10 may be employed as a billing recorder or a load survey recorder to record measurement data provided by a utility device, such as an electric meter, a gas meter, a water meter or the like or any other type of periodically recurring data as may be provided by a monitoring or measuring device. The event data is provided by a data source 11 connected to the utility device (not shown), which provides pulses indicative of such measurement data and extends the pulses to the data recording circuit 12. The data recording circuit 12 includes a data record control circuit 13 which responds to the pulses to provide energizing signals for the data record head Dh over a suitable data record head driver circuit 14.

The time recording circuit 15 includes a time data reference source 16 which provides time reference data including time of day data and calendar date data. In accordance with the present invention, the time reference data source 16 provides a four digit representation including hour and minute of time and a four digit representation of date including day and month.

The time reference data provided by the time reference data source 16 is supplied to a time record control circuit 17 which provides energizing signals for the time record head Th over a time record head driver circuit 18. The time record control circuit 17 also effects the recording of an identification number on the tape T for identifying the data recorder 10.

While in the exemplary embodiment the time and date data and the identification data are recorded on a common track, it is apparent that multi-track recording may be used to permit the time and date data and the identification data to be recorded in separate tracks or in a plurality of tracks. Also, timing pulses may be recorded in one track and the time and identification data may be recorded in one or more tracks. In addition, the time and date data and the identification number may be recorded in one track, and through the use of a suitable inverter, the inverse of such data may be recorded in a further track for redundancy checking purposes.

The data recorder circuit 12 and the tape transport apparatus 19 may be similar to those employed in the load survey unit described in the U.S. Pat. No. 3,929,772 to Norman F. Marsh et al., referenced above, which records event data in one track and a time reference in another track. For multitrack recording, employing more than two tracks, a multitrack recorder including a tape cartridge, a transport apparatus and an event data recording circuit of the type disclosed in the U.S. Pat. No. 3,602,458 to W. P. Doby, may be employed. Accordingly, such apparatus will not be described in detail in the present application.

Referring to FIG. 2, which is a block diagram of the time recorder circuit 15 of the data recording apparatus 10, the time recorder circuit 15 includes the time reference data source 16 and the time record control circuit 17. The time reference data source 16 comprises a digital clock 21 which provides digital encoded data representing time and date. A select circuit 22 is controlled by a timing control circuit 23 to select time and date modes of operation for the digital clock 21. The digital clock 21 is operable in the time mode to provide four output words, each of which has seven bits, representing hours and minutes over seven output lines 30a-30g. The first and second output words represent units and tens digits, respectively, for minutes, and the third and fourth output words represent units and tens digits, respectively, for hours. Four digit select lines DS1-DS4 multiplex each digit.

The digital clock is operable in the date mode to provide four output words, each of which has seven bits, representing day and month, the first and second output words representing units and tens digits, respectively, for days, and the third and fourth output words representing units and tens digits, respectively, for months.

The recording apparatus 10 may include a four digit LED display unit 28 to provide a visual readout of time of day and calendar date data as provided by the digital clock 21. Accordingly, the seven bit output of the digital clock 21 is encoded in a format suitable for driving the light emitting diode (LED) display 28. Each of the outputs a-g of the digital clock 21 energize a different one of the seven segments of the four LED arrays of the display unit 28 (FIG. 8) in a manner known in the art. It is pointed out that the display unit 28 may be provided as optional equipment, and that many recording units 10 employed in the field may not have an associated display unit 28. However, such units are provided with an input/output port to permit the connection of an external display unit 28 to the recorder apparatus by an installer to permit the display of the current time and date data as provided by the digital clock when the recording apparatus is installed.

A time set circuit 24 permits the digital clock 21 to be manually set for a selected date and time to provide the proper time and date reference when the data recording apparatus 10 is initially installed. The setting of the digital clock 21 is displayed by the display unit 28 while the digital clock 21 is being set to the current time and date.

The time record control circuit 17 includes a multiplexer circuit 25 which is operable under the control of timing pulses which are provided by the timing control circuit 23, to extend the data signals provided on output lines 30a-30g of the digital clock 21 to a data latch circuit 26. The multiplexer circuit 25 receives the parallel data bits which are provided on output lines 30a-30g and serially routes the seven bits which comprise each output word to the data latch circuit 26.

The multiplexer circuit 25 also extends the data output provided by an identification data source 29, which provides a twenty bit word, which identifies the data recorder apparatus 10, to the data latch circuit 26 after the time and date information have been recorded on the tape T.

The data latch circuit 26 is operable when enabled to receive each of the data pulses provided by the multiplexer circuit 25 and to extend the pulses to the record head driver circuit 18 to permit the time and date signals and the identification data to be recorded on the time track of the magnetic tape T. A phase encoder circuit 27, which is interposed between the output of the data latch circuit 26 and the recorder driver circuit 18, enables the time reference and identification data to be recorded in a bi-phase format to permit a clock signal to be derived from the recorded data.

The sequencing of the time record circuit 17 is controlled by the timing control circuit 23 which receives a timing input over lines 31 and 32 from output DS1 of the digital clock 21. The timing control circuit 23 provides timing outputs over lines 37 and 38 for enabling the multiplexer circuit 25 and over line 40 for enabling the data latch circuit 26 and the phase encoder circuit 27. In addition, a timing output provided over line 39 is extended over a select gate 35 and line 36 to the select circuit 22 for enabling the selection of time and date operating modes for the digital clock 21. The select gate 35 enables the digital clock 21 to be normally operable in the time mode and to be operable in the date mode only when date information is to be recorded.

In the illustrative embodiment wherein the data recording apparatus is employed as a billing recorder, the time reference data and the identification data are written on the tape during a 180 second write period at five minute intervals synchronized to the lowest order digit output of the digital clock 21, that is, the minute units digit. In other applications, the time reference data may be written at longer time intervals. For example, in an application as a survey recorder, the time reference data may be written at 10 or 15 minute intervals.

The encoded data is written at a rate of one binary bit for each two seconds (four seconds for a survey recorder). The time data is written during the first 64 seconds of the write period. The date data is written during the next 64 seconds of the write period. The total message time is 168 seconds. It is pointed out that the data is recorded in the reverse order of playback, and accordingly, a four bit start code is written during the remaining twelve seconds to indicate the start of a message when the tape is played back during processing. Upon playback of the recorded data, the start code is read first followed by month, day, hours, and minutes data.

The 180 second write period is defined by the setting of write gate 42 which enables the data latch circuit 26 for a 3 minute period. During normal operation, the write gate 42 is enabled by an output of a write gate enable decode circuit 43 and associated control logic 44 which decode data representing either a zero or a five provided at the output of the digital clock 21 when the digital clock is operating in the time mode. A write gate disable decode circuit 45 inhibits the write gate 42, and thus the data latch circuit 26, when data representing the coding of either a three or an eight is provided at the output of the digital clock 21. Accordingly, during a given ten minute interval, starting with a zero output, that is at 0, 10, 20 ... minutes, the write gate is enabled during the first three minutes of the period and is disabled during the next two minutes and clock pulses at a 2 second rate are recorded on the tape. When the output of the digital clock 21 becomes a five, that is, at 5, 15, 25 ... minutes, the write gate is again enabled for a 3 minute period and then disabled for 2 minute period, after which the cycle repeats continuously. When the data recording apparatus is employed as a survey recorder, the clock pulses may be provided at a 4 second rate and the write interval may be 6 minutes in duration followed by a 4 minute interval during which time clock pulses are recorded on the tape. The write cycle for such application is initiated upon the detection of 0, 10, 20 ... etc. minutes.

The data latch circuit 26 is enabled upon the setting of the write gate 42 to receive the data bits, which comprise the date time reference data and the identification data provided at the output of the multiplexing circuit 25.

The setting of the write gate 42 also enables a reset circuit 46 to provide a reset pulse to the timing control circuit 23 to reset the timing control circuit 23 to start from a count of zero.

For the purpose of preventing the erroneous writing of data in the event of loss of power or on start-up, a hold off latch circuit 48 is set upon the application of power to the time recording circuit 15 and remains set to inhibit the write gate until a data output representing a three or an eight is provided by the digital clock. The hold off latch 48 effects resetting of the control logic so that the time source is operable in the time mode. At such time, the hold-off latch 48 is permitting the write gate to be enabled with the next zero or five output of the digital clock 21.

Briefly, in operation, assuming that the digital clock 21 is operating in the time mode and that the data on output lines 30a–30g of the digital clock 21 changes from a coding for the digit 9 to the coding for the digit 0, at such time the write enable decoder circuit 43 is responsive to the output of the digital clock 21 to set the write gate 42, as indicated in line A of the timing diagram shown in FIG. 3. The write gate 42 enables the data latch circuit 26 to receive data pulses from the multiplexer circuit 25 and also enables the reset circuit 46 to provide a reset pulse, line B of FIG. 3, to effect the reset of the timing control circuits 23. Accordingly, the timing control circuits 23 begin counting from zero to define the 64 second "write time" interval, indicated in line E of FIG. 3, during which time, the time data is transferred from the digital clock 21 to the data latch circuit 26 over the multiplexer circuit 25. When the timing control circuit 23 is reset to zero, output Q13 on line 39, indicated on line C of FIG. 3, enables the select circuit 22 to select the time mode for the digital clock 21.

The first word written is the seven bit word representing the minutes unit digit. The seven data bits provided at the output of the digital clock 21 are extended in parallel to the multiplexer circuit 25 which is enabled by the digit select output DS1 of the digital clock 21 and timing pulses provided over line 37 from the timing control circuit 23 to output the bits serially to the data latch circuit 26 and thence to the phase encoder circuit 27 under the control of clock pulses provided to the data latch circuit 26 and the phase encoder circuit 27 over line 40 from the timing control circuit 23. The data is written at two second intervals and thus at the end of a 14 second timing interval, the seven data bits representing the coding for the minutes unit digit have been written on the tape. At the end of the 14 second interval, an additional logic 1 level bit provided by the multiplexer 25 is recorded on the tape to prevent the recurrence of a start code during the message.

During the next 16 second interval, the minutes tens digit data is provided at the output of the digital clock 21 and extended over lines 30a–30g to the multiplexer circuit 25 and serially gated to the data latch circuit 26 and the phase encoder circuit 27. Thereafter, in a similar manner, the digital clock 21 provides the seven bit word representing the hours units digit and the hours tens digit which are extended over the multiplexer circuit 25 to the data latch circuit 26 to be written on the tape.

At the end of the first 64 second interval of the writing period, the timing control circuits 23 provide an output, line C of FIG. 3 which is extended over the select gate 35 and line 36 to the select circuit 22 to define the 64 second "write date" interval, indicated at line F of FIG. 3, during which time the date data is transferred from the digital clock 21 to the data latch circuit 26 over the multiplexer circuit 25. Accordingly, for the next 64 seconds, the four digits representing the date information is written in corresponding 16 second intervals. The units and tens digits of the day are written in respective first and second 16 second intervals of the "write date" interval and the units and tens digits of the month are written during the third and fourth 16 second portions, respectively, of the "write date" interval. Thus, after 128 seconds have elapsed, data representing the time and date have been passed over the data latch circuit 26 and the phase encoder circuit 27 and recorded on the tape.

After the first 128 seconds of the write cycle, the timing control circuit 23 provides an output over line 38 which transfers the control from writing time and date to writing the identification code for the recording apparatus 10. At such time, the timing control circuit 23 provides an output over line 38, shown in line D of FIG. 3, which enables the multiplexer circuit 25 to gate the outputs of the identification data source 29 to the data latch circuit 26 for a forty second period, indicated in line G of FIG. 3.

Following the writing of the identification number data on the tape, the multiplexer circuit 25 effects the writing of the beginning of message code during an eight second period, indicated in line H of FIG. 3.

As indicated in line C of FIG. 3, at the time the multiplexer circuit 25 is enabled to pass the identification code to the data latch circuit 26, the output on line 39, shown in line C of FIG. 3, enables the digital clock 21 to be operable in the time mode for a further sixty four second period. Accordingly, after 180 seconds have elapsed, the digital clock 21 provides outputs which represent the coding for the digit 3 and such outputs cause the write gate disable decoder circuit 45 to disable the write gate 42, inhibiting the data latch circuit 26. The write gate 42 and the data latch circuit 26 remain disabled for a 2 minute period after which the cycle is repeated. Timing pulses at a 2 second rate are recorded on the tape in a biphase format during such 2 minute interval. Accordingly, the biphase signals representing the time and date data and the timing pulses permit a two second time reference to be derived from the recorded information.

In the event of the loss of power to the data recording circuit 15, the hold off latch 48 is enabled upon the restoration of power to inhibit the write gate 42 to prevent the writing of time or date data until an output word representing the coding for either the digital 3 or the digit 8 is provided by the digital clock 21 and detected by the write gate disable decoding circuit 45. At such time, the hold off circuit 48 is disabled and its normal operation is provided.

DETAILED DESCRIPTION

Digital Clock

FIGS. 4–6, when arranged as shown in FIG. 12 provide a partial block and schematic circuit diagram for the time reference source 16 and the time record control circuit 17. Referring to FIG. 4, the digital clock 21 may comprise a Digital Watch Integrated Circuit, such as the Type MS680, which is commercially available from Ragen Semiconductor. The clock module 61 provides month, day hour and minute data on seven segment outputs *a–g*, and four digit select outputs W, X, Y, and Z.

Power for the time reference source 16 and the time record control circuit 17 is provided by a voltage source 62 which derives a DC level +V1, which may be 12 volts, for example, from a 120 VAC source, and a voltage regulator circuit 63 which derives a further DC level +V2, which may be 3 volts, for example, from the level +V1. The time record control circuit 17 is energized by the +V1 level, and the time reference source 16 is energized at level +V2. A rechargeable battery 65 maintains power to the clock module 61 upon loss of AC power. The battery 65 is trickle charged when AC power is available. In the event of a power loss, only the digital clock module 61 is energized, to conserve power.

The clock module 61 provides the month, day, hour, and minute data on the seven outputs *a–g* and the four digit select outputs W–Z, which are multiplexed at a 64 Hz rate. The clock module 61 provides uninterrupted time and date data and automatically compensates for leap years. Accordingly, once the clock module 61 is set for the current time of day, and day of month, the output word (or words) representing the month is automatically incremented at the end of each month and the coding of the output words representing the day changes to that for the digit one, for indicating the first day of the month.

A crystal controlled oscillator 66 comprising a crystal CR1, having a natural frequency of 32.768 KHz, and associated bias elements, including resistors R1 and R2 and capacitors C1 and C2, provide a drive frequency for the digital clock module 61 upon loss of AC power to enable the digital clock module 61 to remain operable until AC power is restored.

The seven segment outputs *a–g* of the clock module 61 are connected over respective buffer amplifiers 74–80 to respective output lines 30*a*–30*g*. The buffer amplifiers 74–80, which may be the Type MC3301, commercially available from National Semiconductor, are operable to raise the 3 volt levels of the signals which are provided by the digital clock module 61 to 12 volt levels for the logic circuits which comprise the time record control circuit 17. Output lines 30*b*, 30*e*, 30*f* and 30*g* are also extended over inverters 81–84 to provide suitable inputs for the write enable and the write disable decoder circuits.

The four digit select output W–Z, which are of opposite sense relative to the segment outputs *a–g*, are extended over buffer amplifiers 85–88 and associated inverters 89–92 to the digit select lines DS4–DS1, respectively. Line DS4 is the highest order digit and line DS1 is the lowest order digit. In the present example, for operation in the time mode, the line DS4 corresponds to the hours tens digit, and the line DS1 corresponds to minutes units digit. For operation in the date mode, the line DS4 corresponds to the tens digit for months, and the line DS1 corresponds to the units digit for days.

The outputs DS1–DS4 are multiplexed at a 64 Hz rate and the 64 Hz signal on line DS1 is extended to the timing control circuit 23, shown in FIG. 5, to provide a time reference for the timing control circuit 23.

The select circuit 22 comprises switching transistors Q1 and Q2 and an inverter 72. Transistors Q1 and Q2 control the voltage level at the date and time inputs, respectively, of the clock module 61. Transistor Q1 has its collector connected to +V2 and its emitter connected to the time input of the module 61 and over a resistor R4 to ground. The base of transistor Q1 is connected over a resistor R5 to line 36 which extends the select input signal from the timing control circuit 23 to the select circuit 22 at point 73. The input of the inverter 72 is connected to point 73 and the output of the inverter 72 is connected over a resistor R6 to the base of transistor Q2 which has its collector connected to +V2 and its emitter connected to the date input of the module 61 and over a resistor R7 to ground.

When line 36 is at logic 1 level, transistor Q1 is enabled and transistor Q2 is disabled to permit an enabling signal to be extended to the time input of the module 61. When line 36 is at a logic 0 level, transistor Q2 is enabled and transistor Q1 is disabled to permit an enabling signal to be extended to the date input of the module 61.

The clock module 61 has reset inputs 61a, 61b, and 61c, pins 24, 22, and 1 of the module 61, connected to the manual time set circuit 24 to permit setting of the minute, hour and day indication for the module 61 upon the application of pulses provided by a pulse generating circuit of time set circuit 24.

Referring to FIG. 7, there is shown one example of a pulse generating circuit 68 which may be used for this purpose. The pulse generating circuit 68 comprises a timing circuit 70, such as the Type NE555, commercially available from Signitics, and which is connected for operation as a multivibrator. Resistor R21 and capacitor C3 determined the frequency of the multivibrator circuit, which may provide pulses at a 1 second rate when the pulse generating circuit 68 is enabled by operation of an advance pushbutton SW5.

The signal output of the multivibrator 60 at pin 3 is extended over manually operable switches SW1-SW3 to the reset inputs 61a-61c of the clock module 61. A double-pole double-throw switch SW4 controls the select circuit 22 to supply an enabling input to either the time or the date input of the clock module 61. The switch SW4, which has a center off position, is operable to a "time on" position to connect +V2 to the base of transistor Q1 and ground to the base of transistor Q2 to select the time mode, and is operable to a "date on" position to connect +V2 to the base of transistor Q2 and ground to the base of transistor Q1 to select the date mode. Thus, when the advance switch SW5 is operated, the multivibrator circuit 70 provides 1 second pulses which are extended to one of the inputs 61a-61c, depending upon which of the switches SW1-SW3 is operated. When it is desired to step the minute or the hour count, the switch SW4 is operated to the "time on" position, and when it is desired to step the date, the switch SW4 is operated to the "date on" position.

Referring to FIG. 8, there is shown a schematic circuit representation of an LED display unit 28, which may be incorporated into the recording apparatus 10, or connected externally to the apparatus 10. The LED unit 28 comprises a four digit LED display module 69, such as the Type DL34, commercially available from Litronics. The digit select lines DS1-DS4 are extended over buffer amplifiers Q3Z-Q3W to digit select inputs 69Z-69W of the display module 69. The segment outputs 30a-30g are extended over respective buffer amplifiers 71a-71g to corresponding segment inputs 69a-69g of the display 69. Alternatively, a liquid crystal display unit may be employed.

As indicated above, not all of the recording units employed may have an associated display unit 28. However, the digital clock module 61 has an input/output port which permits connection of an external display unit when it is desired to monitor the output of the digital clock 61. The display unit 28 normally displays time data except for the 64 second interval when date information is being recorded. At other times, the display of date information is inhibited by a microswitch SW6, which is operated whenever a tape cartridge is inserted into the recorder apparatus 10. The operation of the manual time/date select switch SW4 is ineffective to enable the clock module 61 from being operable in the date mode unless the tape cassette is first removed from the recording unit 10, permitting the switch SW6 to close. Switch SW6 is shown operated to an open position, as when a cassette is loaded into the apparatus 10.

Timing Control Circuit

Referring to FIG. 5, the timing control circuit 23 comprises a 14 stage ripple carry binary counter-divider 92, such as the type MC14020, commercially available from Motorola. The ripple counter 92 has an input at pin 10 connected to line DS1 to receive the 64 Hz signal provided on line DS1 by the clock module 61. The counter 92 is operable to divide the 64 Hz signal over successive stages to provide clock or timing pulses at a one second rate at an output Q6 and pulses at a two second rate at an output Q7 which are extended over lines 40 to control the data latch circuit 26 and the phase encoder circuit 27. The counter 92 also provides outputs at 4, 8, 16, 32 and 64 second rates at respective outputs Q8–Q12.

The timing pulses provided at outputs Q8–Q10, shown in lines A–C of FIG. 9, are extended over lines 37 to the multiplexer circuit 25 to enable sequential routing of the seven bit output words provided by the clock module 61 over lines 30a–30g to the data latch circuit 26, during the "write time" and the "write date" cycles. In addition, the timing pulses are employed to gate the bits of the 20 bit identification code word provided by the identification source 29 to the data latch circuit 26.

The timing pulses provided at outputs Q11 and Q12, shown in lines D and E of FIG. 9 are extended over lines 38 to the multiplexer circuit 25 to enable selection of time and date data provided by the clock module 61 or identification data provided by the identification data source.

The ripple counter 92 also provides timing pulses at a 128 second rate, (line F, FIG. 9) at output Q13 and line 39 which enables selection of the time or date mode for the clock module 61. A further timing pulse at a 256 second rate is provided at output Q14 of the divider circuit 92 and is used in the selection of data from the clock module 61 or the identification data source 29.

The counter 92 is reset to zero in response to a reset pulse supplied to a reset input R of the counter 92 at the start of each write cycle.

Multiplexer Circuit

The multiplexer circuit 25 comprises five 8-channel data select circuits 101-105, which may be the type MC14512, commercially avialable from Motorola, and dual binary 1-out-of-4 select circuit 106, which may be the type MC14555, commercially avialable from Motorola. The multiplexer circuit 101 receives the four digit select outputs provided over lines DS1-DS4 over respective inputs 101X0-101X3, and serially routes the signals extended to inputs 101X0-101X3 to an output 101z of the multiplexer circuit 101 under the control of timing pulses provided over lines 110 and 111 which are connected to outputs Q11 and Q12 of the divider circuit 92.

Multiplexer circuit 102 receives the seven segment outputs provided over lines 30a-30g by the clock module 61 over respective inputs 102X1-102X6 of the multiplexer circuit 102. A further input 102X7 of the circuit 102 is connected to the output 101Z of the multiplexer circuit 101 to enable a logic one level bit to be gated to the data latch circuit 26 after the seven segment bits appearing on 102X0-102X6 have been gated to the data latch circuit 26.

The multiplexer 102 serially routes the signals extended to inputs 102X0-102X6 to an output 102Z of the multiplexer circuit 102 under the control of timing pulses provided over lines 112-114 which are connected to respective outputs Q8-Q10 of the divider circuit 92.

The multiplexer circuit 102 is enabled to respond to the timing pulses provided on line 37, which includes lines 112-114, to route the signals supplied to inputs 102X0-102X7 of the circuit 102 to the output 102Z whenever an enabling signal is supplied to an input 102D by a gate 116. Gate 116 comprises a NAND gate having a first input connected to the output 101Z of the circuit 101. The output Q14 of the divider circuit 92 is connected over an inverter 115 to a second input of gate 116 to enable gate 116 during the first 128 seconds of each write cycle.

Multiplexer circuits 103-105 are controlled by the timing pulses provided over lines 112-114 to extend the twenty bit identification code to the data latch circuit 26. Inputs 103X0-103X7 and 104X0-104X7, of respective multiplexer circuits 103 and 104 and inputs 105X0-105X3 of multiplexer circuit 105 are connected to a different one of the outputs, indicated as $2^0 - 2^{19}$ of the identification data source 29 to receive the twenty bit identification code. The identification data source 29 provides hard wired logic inputs to the multiplexer circuits 103-105, represented by block 29, which extend either a logic one or a logic zero to the input of the multiplexer circuit 103-105 connected thereto. A further input 105X4 of multiplexer circuit 105 is connected to an output indicated as $2^{20}$ of the identification source 29 which provides a logic zero level to such input. Further inputs 105X5-105X7 of multiplexer circuit 105 are commonly connected to the output 101Z of multiplexer circuit 101 which is normally maintained at a logic one level as multiplexer 101 operates.

The multiplexing circuits 103-105 are enabled to respond to the timing pulses provided over lines 112-114 whenever an associated enabling circuit, respective gates 118-120 are enabled. Gates 118-120 each have a respective input commonly connected to the output Q14 of the divider circuit 92. Gates 118-120 each have second inputs connected to respective outputs 121-123 of the select circuit 106. The select circuit 106 responds to the timing pulses provided over lines 110 and 111 to sequentially apply a logic one level to outputs 121, 122 and 123 in sequence. Accordingly, when output Q14 of the divider circuit 92 becomes a logic one level after 128 seconds have elapsed during a write cycle, gates 118-120 are enabled in successive 16 second periods as defined by the outputs of the select circuit 106. Accordingly, during the first 16 second period, multiplexer circuit 103 will be enabled to gate the first eight bits of the identification code to the data latch circuit 26. During the next 16 second period, multiplexer circuit 104 will be enabled by gate 119 to respond to the clock pulses provided on lines 112-114 to gate the next eight bits of the identification number to the data latch circuit 26. Thereafter, during the next sixteen second period, multiplexer circuit 105 is enabled by gate 120 to gate the last four bits of the identification data and the four bits which comprise the beginning of message code to the data latch circuit 26.

Data Latch Circuit

The data latch circuit 26 comprises a D type latch circuit 130 and a retriggerable one shot circuit 131. The data latch circuit 130 may, for example, be a D-type latch such as the type 4013, commercially available from RCA. The one shot circuit 131 may be the type 14528 retriggerable monostable circuit, commercially available from Motorola.

The data bits provided at the output of the multiplexer circuit 25 at point 109 are extended to the latch circuit 130 over the retriggerable one shot circuit 131. Inasmuch as the logic levels at point 109 are not sustained for a full two second period due to the switching times of the multiplexer circuits 102-105, the one shot circuit 131 provides a continuous signal to the data input of the latch circuit 130 for the two second bit write period. The one-shot circuit 131 is triggered by the leading edge of each positive going pulse provided at output 109 of the multiplexer circuit 25. When a logic 0 level bit is provided at output 109, the one shot circuit 131 is not triggered, and after its time out, provides a logic 0 input to the data latch circuit 130.

The latch circuit 130 receives a clock pulse at a one second rate provided at output Q6 of the divider circuit 92 and is operable when enabled by the write gate 42 during the 180 second time interval, which defines the write cycle, to store each data bit provided at the multiplexer output 109 for a two second interval to provide continuous inputs to the phase encoder circuit 27.

Phase Encoder Circuit

The phase encoder circuit 27 comprises three NAND gates 141-143 and a time delay circuit 144 embodied as a latch circuit 145 which may be the type 4013 Data Latch, circuit commercially available from RCA. Gates 141 and 142 have respective inputs 146 and 147 connected to the true and false outputs, respectively of the latch circuit 130. In addition, gates 141 and 142 have respective inputs 148 and 149 connected to the true and false outputs respectively, of latch circuit 145. The outputs of gates 141 and 142 are connected to inputs of gate 143 the output of which is extended to the record head driver circuit 18.

The latch circuit 145 provides a two second output (FIG. 10) delayed ½ second from the two second output of the clock signal supplied at output Q7 of the counter 92 to assure that the state of data latch 130 has stabilized before gates 141 and 142 are enabled to gate the data to the recording circuitry over the phase encoder circuit 27. The latch circuit 145 has a data input connected to the output Q7 of the divider circuit 92 which provides a timing pulse at a two second rate. Clock signals for the latch circuit 145 are provided at a one second rate by the timing pulses provided at output Q6 of the divider circuit 92.

Phase encoder circuit 27 is operable to write phase encoded timing pulses on the tape at a two second rate to provide a time reference for the event data. A logic 1 is written on the tape by recording a logic 0 level pulse for the first half of each two second period and logic 1 level pulse for the last half of the period. A logic 0 is written by recording a logic 1 level for the first half of the two second bit write period and a logic 0 for the last half of the period. The zero crossover provided by each biphase signal enables a two second clock pulse to be derived from the recorded data, including the timing pulses and the message data permitting reconstruction of data and time information recorded on a single track. It should be noted that upon playback, each phase encoded logic 1 is defined by a logic 1 level followed by a logic 0 level, and each phase encoded logic 0 is defined by a logic 0 level followed by a logic 1 level.

Write Gate

Referring to FIG. 6, there is shown a symbolic representation of the write gate 42 and the associated control logic circuits 43-45. The write gate 42 is comprised of a pair of NAND gates 151 and 152 connected as a latch circuit having a set input 153, reset inputs 154 and 155, a true output 156 and a false output 157. The write latch 42 is set by the write gate enable decode circuit 43 in response to the detection of the coding of the digit 0 or 5 as provided by the clock module 61. The write gate enable decode circuit 43 is comprised of NAND gates 161-163 which are operable to extend an enabling input to the set input 153 of the write gate 42 over gates 164-166 of the control logic 44.

The write gate 42 is reset upon the detection by the write gate disable decode circuit 45 of the coding for a digit 3 or 8 provided by the clock module 61. The write gate disable decode circuit 45 is comprised of gates 171-173 which enable a further NAND gate 174 of the control logic to apply a reset input 154 of the write gate 42.

When the write gate is set, the write gate 42 enables gate 181, which comprises the select gate 35 to pass the time and date select signal provided at output Q13 of the divider circuit 92 to the select circuit 22 (FIG. 4). In addition, the false output 157 of the write gate 42 is connected to the reset input of the data latch circuit 130 to enable the data latch circuit 130 whenever the write gate 42 is set.

Referring to the write enable decode circuit 43, gate 161 has inputs 161a-161d connected to respective output lines 30b, 30e, 30f and 30g such that gate 161 is enabled whenever the coding for the digit 0 is provided by the clock module 61. Gate 162 has inputs 162a-162d connected to respective output lines 30b, 30e, 30f, and 30g such that gate 162 is enabled whenever the coding for the digit 5 is provided by the clock module 61. Gate 163 functions as an OR gate to pass the output of gates 161 and 162 to an input 164a of gate 164 which has second and third inputs 164b and 164c connected to the outputs of inverters 169 and 170, respectively, which are connected to outputs of respective gates 167 and 168. Gate 167 has inputs 167a-167c connected to output lines 30a, 30c and 30d, respectively, and is enabled whenever the coding for the digits 0, 3, 5 or 8 is provided by the clock module 61. Gate 168 has an input 168a connected to digit select line DS1 and an input 168b connected to the output of the select gate 35 to be enabled whenever the clock module 61 is operable in the time mode.

Considering the write gate disable decode circuit 45, gate 171 has inputs 171a-171d connected to outputs 30b, 30e, 30f, and 30g, respectively, and is enabled whenever the coding for the digit 3 is provided by the clock module 61. Gate 172 has inputs 172a-172d connected to output lines 30b, 30e, 30f and 30g, respectively, and is enabled whenever the coding for the digit 8 is provided by the clock module 61. Gate 173 functions as an OR gate to gate the outputs of gates 171 and 172 to an input 174a of gate 174 which has second and third inputs 174b and 174c connected to the outputs of inverters 169 and 170 and is enabled whenever gates 167 and 168 are enabled in response to the coding for one of the digits 0, 3, 5, or 8 provided by the clock module 61 at the start of each write cycle.

Reset Circuit

The reset circuit 46 comprises a discrete one-shot circuit comprised of a NAND gate 191 and inverters 192 and 193. The input of the reset circuit at the input of inverter 192 is connected to the false output 157 of the write gate 42. Timing elements, including resistor R22 and capacitor C8 establish the pulse width for the reset pulse, which may by 200 ns. The output of the reset circuit at the output of gate 191 is extended to the reset input of the divider circuit 92. A second input to the reset circuit 46 is provided by the hold off circuit 48 which enables the counter 92 to be reset in the event of a power loss for the time record circuit 15.

Hold Off Circuit

The hold off circuit 48 is comprised of a pair of NAND gates 195 and 196, connected for operation as a latch circuit 197. The hold off circuit 48 further comprises a pulse generating circuit 194 comprised of inverters 198 and 199 and a timing circuit 200 including resistor R23 and capacitor C9. The set input 201 of the hold off latch 197 is connected to the output of inverter 199 which is also connected to a further reset input 155 of the write gate 42. In the event of a power loss, the timing circuit 200 resets upon reapplication of power to effect the generation of a pulse which is extended over inverters 198 and 199 to set the hold off latch 197 to reset the write gate 42. The hold off latch 197 is reset by gate 174, which is enabled by the write gate disable decoder circuit 45 when the clock module 61 provides an output representing the coding for a 3 or an 8. The false output of the hold off latch 197 at point 203 is connected to an input 166b of gate 166 to prevent the setting of the write gate 42 whenever the hold off latch 197 is set.

OPERATION OF THE TIME RECORD CIRCUIT

Referring to FIGS. 11A-11C, there is shown representations for the time, date and identification number data, respectively, which is recorded on the tape when the write gate 42 is set to define a given write time interval. The time, date and identification number data are shown in separate FIGS. 11A-11C, respectively, to simplify the drawings. However, during a given recording interval, the recorded message is comprised of the data shown in FIGS. 11A-11C. Thus, the left hand portion of FIG. 11A corresponds to the right hand portion of FIG. 11B, and the left hand portion of FIG. 11B corresponds to the right hand portion of FIG. 11C. Each of the FIGS. 11A-11C should be read from right to left as this corresponds to the order in which the data is recorded on the tape, and is the reverse of the order in which the data is played back.

Referring to FIG. 11A, by way of example, it is assumed that the recording is occurring at 8:10 A.M. The time at which the write gate 42 is set to enable the transfer of data from the digital clock 21 to the data latch circuit 26 is indicated at the right hand portion of FIG. 11A in line I. Line II represents clock pulses provided at a two second rate which corresponds to the write time for each bit of the output data. Lines III and IV represent the digital coding for the segment outputs appearing on output lines 30a–30g and the phase encoded data provided by the phase encoder circuit 27, respectively. Prior to the setting of the write gate 42, the phase encoder circuit 27 effects the writing of logic 0 bits on the tape, encoded as logic 1 and logic 0 levels, as shown in line IV of FIG. 11A. When the write gate 42 is enabled, and the data is supplied to the data latch circuit 26 over the multiplexer circuit 25, the data latch circuit 26 controls the phase encoder circuit 27 to write each logic 1 level bit as a logic 0 level followed by a logic 1 level in a two second time period, and each logic 0 level bit as a logic 1 level followed by a logic 0 level in a 2 second period. As shown in FIG. 11A, during the first 16 seconds of the "write time" cycle, the coding for the digit 0 is provided over output lines 30a–30g. During the next 16 second period, the coding for the digit 1 is provided on output lines 30a–30g. During the time from 32–48 seconds, the coding for the digit 8 is provided.

Referring to FIG. 11B, which shows the date data by way of example, it is assumed the data recording is occurring on the 29th day of April. Accordingly, the date information which is recorded on the tape includes the coding for the digit 4 for the month, and the coding for the digits 2 and 9 corresponding to the tens and the units digits, respectively, of the day, such data being recorded during the "write date" cycle during the time from 64 seconds to 128 seconds of the write cycle.

Referring to FIG. 11C, by way of illustration, it is assumed that the identification code number to be recorded on the tape to identify the recording apparatus 10 is 867560. The binary coding for such number is shown at line III of FIG. 11C. The identification code is written on the tape during the time from 128 seconds to 168 seconds of the write cycle. During the time from 168 seconds to 176 seconds of the write period, the start of message code, which is comprised of a logic 0 level followed by three logic 1 levels, is written on the tape, and for the remaining 4 seconds of the write cycle, logic 0 bits are encoded and written on the tape. As shown in FIG. 11C, at the end of the 180 second write cycle, the write gate 42 is disabled, and the phase encoder circuit 27 effects the writing of logic 1 and logic 0 levels, alternately on the tape, representing the coding for logic 0, such encoded logic 0 bits being recorded on the tape at two second intervals. In the exemplary embodiment, the start code, as recorded, is shown to be comprised of a logic 0 level followed by three logic 1 levels. However, it is apparent that other combinations of bits may be employed as the start code.

Referring now to FIGS. 4–6, the clock module 61 is normally operating in the time mode due to select gate 35, and thus, when the digit output of the digital clock 21 changes from 9 to 10 minutes, the digital clock module 61 provides the coding for the digit 0 on outputs a–g (line III, FIG. 11A), with outputs a–f being logic 1 levels and output g being a logic 0 level so that line 30g is at logic 1 level. Such outputs are extended over the buffer amplifiers 74–80 to the output lines 30a–30g, and thus to the inputs 102X0–102X6 of the multiplexer circuit 102. In addition, the lowest order digit, provided on digit select line DS1 is at a logic 1 level, and accordingly, a logic 1 level is extended to input 101X0 of multiplexer circuit 101 while logic 0 levels, provided on digit select lines DS2–DS4 are extended to inputs 101X1–101X3 of the multiplexer circuit 101.

In response to the logic 1 levels on output lines 30b, 30e, 30f and 30g, gate 161 of the write gate enable decode circuit 43 is enabled, enabling gate 163 providing an enabling input at input 164a of gate 164. Also, gate 167 is enabled by the logic 1 levels appearing on output lines 30a, 30c, and 30d, providing a logic 1 level input to gate 164 over input 164b thereof. Gate 168 is also enabled at this time by the logic 1 level provided on digit select line DS1 and the logic 1 level provided at the output of gate 181 of the select gate circuit 35, which is disabled at this time by the write gate 42. Accordingly, gate 164 is enabled and, assuming that the hold off latch 48 is reset, gate 166 is enabled to set the write latch 42.

When the write gate 42 is set, the reset circuit 46 is enabled to provide a 200 ns reset pulse to the divider circuit 92, allowing reset of all outputs Q6–Q14 of the divider circuit 92 to logic 0.

Referring to the timing diagram shown in FIG. 9, lines A–F show respective outputs Q8–Q13 of the divider circuit 92, lines G–M show the times at which output lines 30a–30g are selected by the multiplexer circuit 102, and lines N–Q show the times digit select lines DS1–DS4 are selected by the multiplexer circuit 101. As shown in FIG. 9 at lines A–F, outputs Q8–Q13 are at logic 0 levels.

The logic 0 levels provided on output lines 110 and 111 (outputs Q11 and Q12) enable the multiplexer circuit 101 to select input 101X0 (line N of FIG. 9) which is connected to digit select line DS1, to gate the logic 1 level signal on line DS1 to the output 101Z of the multiplexer 101, enabling gate 116 to provide an enabling signal for multiplexer circuit 102. Since clock lines 112–114 (outputs Q8 Q10) are also at logic 0 levels, the multiplexer circuit 102 is enabled to select input 102X0 at the time indicated in line G of FIG. 9. Input 102X0 is connected to output line 30a, enabling the logic 1 level signal appearing thereon to be gated to the output 109 of the multiplexer circuit 25.

The retriggerable one-shot is enabled in response to the logic 1 level provided at output 109 to provide an input at logic 1 level to the data latch circuit 130 which has been enabled to receive data pulses in response to the setting of the write gate 42. Referring to FIG. 10, when the divider circuit 92 is reset, clock pulses provided at outputs Q6 and Q7 are at logic 0 levels (lines A and B), the delay latch circuit 145 of the phase encoder circuit 27 is set (line C), and the data latch 130 is reset (line D). The first one second clock pulse sets the data latch 130 since the multiplexer output 109 is at logic 1 level (line E) and resets the delay latch 145 since the two second clock pulse is at logic 0. Accordingly, gates 141 and 142 provide logic 1 outputs, and gate 143 provides a logic 0 level output to effect the recording of logic 0 on the tape.

The two second clock pulse provided at output Q7 of the divider circuit 92 enables the delay latch circuit 145 to be set by the leading edge of the next one second clock pulse provided over output Q6, and since the data latch 130 is set, gate 141 provides a logic 0 output and gate 142 provides a logic 1 output. Thus, gate 143 is enabled to provide a logic 1 output to the time record head driver circuit 18. The phase encoded data, representing the coding for the first bit of the time data, is shown in FIG. 11A at line IV.

After two seconds have elapsed, which corresponds to the write time for the first bit of the output word, timing output Q8 of the divider circuit 92 becomes a logic 1 level as shown in line A of FIG. 9. When output Q8 becomes a logic 1, while outputs Q9–Q12 remain at logic 0, multiplexer circuit 102 is enabled to select input 102X1 which is connected to output line 30b. As shown in line N of FIG. 9, multiplexer circuit 101 continues to select input 101X0 for a 16 second period, and thus, gate 116 remains enabled for such time. Accordingly, the signal on output line 30b is routed to the output 109, triggering the one-shot circuit 131 to maintain the data latch 130 set for the next two second period as shown in line D of FIG. 10. Since at this time, the two second timing pulse at output Q7 is a logic 0 level, the delay latch 145 is reset, and gate 143 provides a logic 0 output to drive circuit 18. One second later, output Q7 again becomes a logic 1 level, causing delay latch 145 to set, thereby enabling gate 143 to provide a logic 1 level to drive circuit 18.

Thereafter, inputs 102X2 –102X6 are selected in sequence, enabling the remaining bits of the first output word to be written on the tape. When the input 102X0 is selected, the logic 0 level on line 30g is extended to output 109 of multiplexer circuit 25. Accordingly, one-shot circuit 131 is not retriggered and times out, enabling the data latch 130 to be reset, permitting a logic 0 to be encoded by the phase encoder circuit 27. Then, input 102X7 is selected, and the additional logic 1 level is enclosed on the tape.

At the end of the first 16 second interval, clock module 61 outputs a logic 1 level on digit select line DS2 and logic 0 levels on digit select lines DS1, DS3 and DS4. Also, at such time, output Q11 of the divider 92 becomes logic 1 while output Q12 of the divider circuit 92 remains a logic 0, enabling the multiplexer circuit 101 to select input 101X1 for extending the logic 1 level on digit select line DS2 to the output 101Z of the circuit 101, maintaining gate 116, and thus the multiplexer circuit 102 enabled. Also, at such time, the clock module 61 provides outputs over output lines 30a–30g, representing the coding for the tens digit of minutes, which in the present example is 1. Accordingly, the timing pulses on lines 112–114 control the multiplexer circuit 102 to select the inputs 102X0–102X7 in sequence to output the seven bit code representing the coding for the digit 1, and the additional logic 1 level bit for routing such bits to the data latch circuit 130 to control the phase encoder circuit 27.

During the third and fourth 16 second intervals which comprise the balance of the "write time" cycle, multiplexer circuit 101 is enabled to select inputs 101X2 and 101X3 which correspond to digit select lines DS3 and DS4 to maintain the multiplexer circuit 102 enabled. Also, the digital clock module 61 outputs the coding for the units digit for hours, 8 in the present example. The tens digit for hours, which is zero in the present example is suppressed by the clock module 61.

At the end of the 64 second "write time" interval, output Q13 of the divider circuit 92 becomes a logic 1 level, as indicated at line F in FIG. 9, enabling the select gate 35, since the write gate 42 is set, providing a logic 0 level over line 36 to the select circuit 22 causing transistor Q1 to be cutoff and enabling transistor Q2 to provide an enabling input to the date input of the clock module 61. Accordingly, during the next 64 second interval, the time recording circuit is operable in the "write date" mode and the four digits representing the units and the tens digits for the month are provided by the digital clock module 61, each of the digits codings being provided in successive 16 second intervals of the "write date" cycle. As each of the four digits are provided, the code words are extended over the multiplexer circuit 102 to the data latch circuit 26 under the control of the timing control circuit 23 which controls the phase encoder circuit 27 to provide the phase encoded data representing the month and date, as shown in Line IV FIG. 11B. The sequencing operation is similar to that for the "write time" cycle.

After an elapsed time of 128 seconds, that is, at the end of the "write date" cycle, output Q14 of the divider circuit 92 becomes logic 1 level, inhibiting gate 116 over inverter 115 and providing an enabling input to gates 118–120 which are selectively operable to enable respective multiplexer circuits 103–105. At 128 seconds, outputs Q11 and Q12 are both logic 0, enabling the select circuit 106 to provide a logic 1 level at output 121 which effects the enabling of gate 118, in turn enabling multiplexer circuit 103 to gate the first 8 bits of the identification code (FIG. 11C, line III) provided by the identification source 29 to the output 109 of the multiplexer circuit 103. The inputs 103X0–103X7 of the multiplexer circuit 103 are selected in sequence in accordance with the timing pulses provided on lines 112–114 by outputs Q8–Q10 of the divider circuit 92.

As the first eight bits of the identification code are serially extended to the data latch circuit 130, the data latch circuit 130 controls the phase encoder circuit 27 to provide the phase encoded data as shown in line IV of FIG. 11C.

After the end of the first 16 second portion of the "write identification code" cycle, the select circuit 106 provides a logic 1 level output at output 122, and logic 0 levels on outputs 121 and 123, which enables gate 119 and permits gate 118 to be disabled. Accordingly, the multiplexer circuit 104 is enabled to gate the next 8 bits of the identification code to the data latch circuit 130 to control the phase encoder circuit 27 for writing the encoded bits on the tape.

After 32 seconds have elapsed, the select circuit 106 provides a logic 1 level on output 123, while outputs 121 and 122 are at logic 0 levels, disabling gate 119 and enabling gate 120 to enable multiplexer circuit 105 for routing the remaining four bits of the identification code and the four start of message bits to the data latch circuit 26, which controls the phase encoder circuit 27 to write the information on the tape.

Since no additional data is provided for the following 4 seconds, the one shot 131 is not triggered and the data latch 130 is thus reset with the next clock pulse, enabling encoded logic 0 bits to be written on the tape for the next 4 seconds. Thereafter, clock pulses at a 2 second rate are written on the tape for the 2 minute interval before the next write cycle is initiated.

It is pointed out that when the divider circuit 92 reaches a count of 128 seconds, the clock module 61 is rendered operable in the time mode for a further 64 second period. Thus, at the end of the write cycle, the clock module 61 is operating in the time mode, providing the coding for the digit 3 which is extended to the write gate disable decoder circuit 45. The write gate disable decode circuit 45 is thus operable to effect the reset of the write gate 42, which inhibits the data latch circuit 130 to prevent the writing of further data on the tape for the next two minute interval. During such time, logic 0 bits are encoded on the tape.

In the event of a loss of power during the write cycle, the clock module 61 continues to be energized by the battery supply 65. However, the write gate 42 is disabled and the hold off latch 197 maintains the write gate disabled for a predetermined time after the power is restored.

Referring to FIG. 11D, assuming there is a power failure for four seconds during the "write time" interval, then the write gate 42 is disabled as indicated in line 1 of FIG. 11D. When power is restored, the charging of capacitor C9 of the timing circuit 200 (FIG. 6) of the hold off circuit 48 causes a pulse to be provided over inverters 198 and 199 which effects the setting of the hold latch 197, the reset of the write gate 42 and the reset of the divider circuit 92 over gate 191 of the reset circuit 48.

When the hold off latch 197 is set, gate 166 is disabled, thereby preventing the setting of the write gate 42. The hold off latch 197 is reset when gate 166 is enabled in response to the enabling of gate 171 or 173 when the coding for the digit 3 or 8 is provided by the clock module 61. At such time, gate 166 is enabled to follow the output of gate 164 over inverter 165 to permit the write gate 42 to be set the next time the coding for the digit 0 or 5 is provided by the clock module 61.

As indicated above, in the event of a power loss, the clock module 61 is energized by the battery source 65, and accordingly, upon restoration of power the time and date are correct. Thus, adjustment of the digital clock 21 is required only on start up through the use of the manual time set circuit 24 shown in FIG. 7.

Months are set by advancing the days to the last day of the indicated month, observing the output of the digital clock 21 on the display unit 28 (FIG. 8), and advancing the hours to 23 hours and advancing the minutes to 59 minutes after which one more advance of the minutes will cause the month to advance 1, that is, into the next month. This sequence is repeated until such time as the required month has been reached by advancing on a one month basis. Depression of advance switch SW5 when day select switch SW3 is operated causes days to advance at a one second rate. Hours are set by depressing the advance switch SW5 when the select switch SW2 is operated causes days to advance at a one second rate. Minutes are advanced upon depression of the advance switch SW5 when the minutes select switch SW1 is operated. To insure that time mode will be functional at 2 and 5 minute intervals, the advance switch SW5 must be depressed about 30 seconds after the display unit 28 reads 4 minutes, or a time ending in 4 such as 4, 14, 24, 34, 44, 54 minutes. Then, when minutes is to be detected, the system will be in the time mode.

I claim:

1. In a data recording apparatus having a data recording means for recording event data provided by a data source on a recording medium, a time reference recording means for recording a time reference for said event data on said recording medium comprising time reference data source means including digital clock means operable to provide coded data words representing time of day information and calendar date information, said digital clock means being operable in a first mode to provide a first plurality of code words representing the coding for the time of day that the time reference is being recorded and operable in a second mode to provide a second plurality of code words representing the calendar date that the time reference is being recorded, and output means for receiving the code words and for providing signals representing said time and date information for recording on said recording medium, including select means operable to normally maintain said digital clock means operable in said first mode, and control means enabled in response to code words provided while said digital clock means is operable in said first mode to permit said time of day information to be recorded on said recording medium during a first time interval, said select means periodically enabling said digital clock means to be operable in said second mode to permit said calendar date information to be recorded on said recording medium during a second time interval.

2. A data recording apparatus as set forth in claim 1 wherein said digital clock means provides coded data representing the minute and hour at which the time reference data is recorded and coded data representing the day and month on which the time reference data is recorded.

3. A data recording apparatus as set forth in claim 2 wherein said digital clock means provides uninterrupted time of day data and calendar date data and automatically compensates for leap year thereby eliminating the need to reset said digital clock means at the end of each month.

4. A data recording apparatus as set forth in claim 1 which includes identification data source means for providing to said output means further coded data representing an identification number for said apparatus, said output means including encoder means responsive to said further coded data to provide signals representing said identification number for recording on said recording medium.

5. A data recording apparatus as set forth in claim 4 wherein said signals representing said time and date information and said signals representing said identification number are recorded on a common track of said magnetic tape.

6. In a data recording apparatus having first and second recording heads, and event data receiving means for providing drive signals for said first recording head for recording event data, which is provided periodically during a given time interval by a data source, on a first track of a recording medium which is moved continuously during said time interval, a time reference recording means for recording a time reference for said event data on a second track of said recording medium, said time reference recording means comprising time reference data source means operable to provide coded data representing time of day information and calendar date information, and output means including timing means responsive to said time reference data source means for continuously providing timing signals, and encoder means responsive to said timing signals and said coded data to generate time reference signals, including signals coded to represent said time of day and calendar data information, and record head driver means responsive to said time reference signals to provide drive signals for said second recording head to record said time reference signals on said second track of said recording medium as a continuous time reference for said event data.

7. A data recording apparatus as set forth in claim 6 wherein said output means includes control means for defining recording intervals for recording said time of day and calendar date information on said recording medium and hold off means operable to disable said control means to inhibit the recording of said time of day and calendar date information during a recording interval in which power is first applied and for reenabling said control means to permit recording during the recording interval next following the interval in which the momentary power loss occurred.

8. A data recording apparatus as set forth in claim 6 wherein said output means includes control means for defining recording intervals for recording said time of day and calendar date information on said recording medium and hold off means operable to inhibit said control means until the end of a recording interval in which power is first applied during a startup condition.

9. In a data recording apparatus having data recording means for recording event data provided by a data source on a multitrack recording medium, a time reference recording means for recording a time reference for said event data on said recording medium comprising timing means for providing timing pulses at a predetermined rate, encoder means controlled by said timing pulses to generate time reference signals at said predetermined rate for recording on one track of said recording medium to provide a continuous time reference for said event data, time reference data source means for supplying coded data representing time of day and calendar date information to said encoder means, and control means for periodically enabling said encoder means to respond to said coded data to encode said time reference signals with said coded data to provide modified time reference signals for recording on said one track of said recording medium as a portion of said continuous time reference.

10. In a multitrack data recording apparatus having at least first and second recording head means, and event data recording means for providing drive signals for said first recording head means to effect the recording of event data provided by a data source on one track of a magnetic tape, a time reference recording means for recording a time reference for said event data on said tape during predetermined recording intervals, said time recording means comprising time reference data source means including digital clock means operable in a first mode to provide code words representing time information, said digital clock means being operable in a second mode to provide code words representing data information, timing control means for providing timing signals for controlling said digital clock means to select the operating mode for said digital clock means, and output means including enabling means responsive to a preselected one of the code words which is provided by said digital clock means at the start of a recording interval to enable said output means to be controlled by said timing control means to receive the code words provided by said digital clock means during said recording interval in a predetermined sequence and to provide drive signals for one of said recording head means to effect the recording of both said time and data information on one of the tracks of said magnetic tape.

11. In a multitrack data recording apparatus having at least first and second recording head means, and event data recording means for providing drive signals for said first recording head means to effect the recording of event data provided by a data source on one track of a magnetic tape, a time reference recording means for recording a time reference for said event data on said tape during predetermined recording intervals, said time recording means comprising time reference data source means including digital clock means operable in a first mode to provide code words representing time information, said digital clock means being operable in a second mode to provide code words representing data information, timing control means for providing timing signals for controlling said digital clock means to select the operating mode for said digital clock means, and output means controlled by said timing control means to receive the code words provided by said digital clock means in a predetermined sequence, said output means including control means having enabling decoder means responsive to a code word provided at the start of each recording interval to enable said output means to provide drive signals for one of said recording head means to effect the recording on one of the tracks of said magnetic tape of the code words provided by said digital clock means during each recording interval, and disabling decoder means responsive to a code word provided at the end of each recording interval to prevent said output means from responding to code words provided during the time between successive recording intervals.

12. A data recording apparatus as set forth in claim 11 wherein said digital clock means is operable in said first mode to provide a first plurality of code words in a sequence representing the coding for the minute and hour that the time reference is being recorded and operable in said second mode to provide a second plurality of code words in a sequence representing the coding for the day and month that the time reference is being recorded.

13. A data recording apparatus as set forth in claim 11 wherein said control means includes means responsive to an output of said digital clock means and said timing signals to enable said output means only when said digital clock means is operable in said first mode at the start of said recording interval.

14. A data recording apparatus as set forth in claim 11 wherein said enabling decoder means and said disabling decoder means respond to code words which represent the unit digit for minutes.

15. In a multitrack data recording apparatus including event recording means for recording event data provided by a data source on one track of a magnetic tape, a time reference recording means for recording a time reference for said event data on said tape, said time recording means comprising time reference data source means including digital clock means operable in a first mode to provide multibit code words representing time information, said digital clock means being operable in a second mode to provide multibit code words representing data information, timing control means for providing timing signals for controlling said digital clock means to select the operating mode for said digital clock means, and output means including phase encoder means operable during predetermined recording intervals to respond to the bits of said code words to provide phase encoded signals at a predetermined rate which represent the bits of said code words for recording on said tape, said phase encoder means being controlled by said timing control means during time intervals between successive recording intervals to provide further phase encoded recording signals at said predetermined rate for recording on said tape.

16. A data recording apparatus as set forth in claim 15 wherein said phase encoder means includes data storage means responsive to output timing signals provided by said timing control means for storing each bit in sequence, a phase encoder circuit operable when enabled to provide a phase encoded drive signal corresponding to each bit, and delay means responsive to said output timing signals to enable said phase encoder circuit at a predetermined time after each bit is stored in said data storage means.

17. A data recording apparatus as set forth in claim 15 wherein said output means includes hold off means for inhibiting said phase encoder means until the end of a recording interval during which a momentary power loss occurs.

18. A data recording apparatus as set forth in claim 15 which includes a multi-digit segmented light emitting diode display means which is controlled by the code words provided by said digital clock means, the bits of said code words providing the binary coding for each digit of said time of day and calendar data information to permit the current time and data information to be displayed by said display means.

19. A data recording apparatus as set forth in claim 15 which includes time reference pulse generating means operable to provide time reference pulses at predetermined intervals, and control means for preventing the code words provided by said digital clock means from being extended to said phase encoder means and for enabling said phase encoder means to provide signals representing said time reference pulses for recording on said magnetic tape.

20. A data recording apparatus as set forth in claim 15 which includes identification data source means for providing a further multibit code word which represents an identification number for said apparatus, and means responsive to further timing signals provided by said timing control means to enable the bits of said further code word to be extended to said phase encoder means during each recording interval.

21. A data recording apparatus as set forth in claim 20 wherein said time recording means provides drive signals for said second recording head means to enable the code words representing said time and data information and said identification number to be recorded on a second track of said magnetic tape.

22. A data recording apparatus as set forth in claim 21 wherein said time recording means effects the recording of signals representing the complement of the bits of the code words representing the time and date information and the identification number on a further track of said magnetic tape.

23. A data recording apparatus as set forth in claim 21 wherein said time recording means is operable to effect the recording of a start of message code on said tape after said time and date information and said identification number have been recorded on said tape.

24. A data recording apparatus as set forth in claim 20 wherein said timing control means is operable to define first, second and third periods within each recording interval, said time of day information being recorded on said tape during said first time period, said calendar date information being recorded on said tape during said second time period, and said identification number being recorded on said tape during said third time period.

25. In a data recording apparatus having data recording means for recording event data provided by a data source on a recording medium, a time reference recording means for recording a time reference for said event data on said recording medium comprising means for providing timing pulses at a predetermined rate, phase encoder means operable during a first time interval to be responsive to each of said timing pulses to provide a bi-phase signal including first and second signals at first and second logic levels at said predetermined rate to permit said time reference to be derived from said bi-phase signal, and time reference data source means for providing a plurality of multibit data words representing time of day and calendar date information, said phase encoder means being operable during a second time interval to be responsive to said timing pulses and said data words to provide further bi-phase signals including a bi-phase signal corresponding to each bit of each of said data words, each of said further bi-phase signals including first and second signals at first and second logic levels in a sequence representing the coding for the corresponding bit to permit said time reference to be derived from said further bi-phase signals, and means for recording said bi-phase signals on said recording medium.

26. In a data recording apparatus for providing a record of events detected by an associated detector device, time reference data source means for providing indications of time, signal means responsive to said time reference data source means for providing coded time data signals representing the time indications, recording means for recording data representing the time indications, recording means for recording data representing such events and said coded timme data signals as a reference for such event data on a recording medium, means for normally providing power to said time reference data source means from a source of power for said recording means, and means for powering said time reference data source means independently of said recording means at least during a time of interruption of power from said power source for said recording means.

27. A data recording apparatus as set forth in claim 26, wherein said time reference data source means comprises digital clock means, and a crystal controlled oscillator for driving said digital clock means, said powering means connecting an electrical energy source to said oscillator and said digital clock means, enabling said oscillator to continue to drive said digital clock means during a time of interruption of power from said power source.

28. A data recording apparatus as set forth in claim 26 wherein said powering means comprises a rechargeable electrical storage battery, said rechargeable battery being connected to said source of power for said recording means to permit said battery to be charged whenever power is available from said power source.

29. In a data recording apparatus for recording event data provided by a data source on a continuously moving recording medium, a time reference recording means for recording a time reference for said event data on said recording medium comprising time reference data source means including digital clock means operable to provide coded data words representing time of day and calendar date information, signal generating means responsive to the coded data words provided during writing intervals for providing signals representing said coded time and date information for recording on said recording medium as a real time reference for the event data, enabling means responsive to preselected ones of the code words provided by said digital clock means for defining the beginning and the end of each writing interval during which the coded time and date data signals are recorded, and timing means for producing timing signals at a predetermined rate for recording on said recording medium as a time reference for the event data between two consecutive writing intervals, to thereby record a continuous time reference for said event data on said recording medium.

30. In a data recording apparatus having a data recording means for recording event data provided by a data source on a recording medium, a time reference recording means for recording a time reference for said event data on said recording medium comprising time reference data source means including digital clock means operable to provide a first plurality of code words representing the coding for the time of day that the time reference is being recorded and a second plurality of code words representing the calendar date that the time reference is being recorded, and output means including signal generating means operable when enabled to respond to said code words to provide signals representing said time and date information for recording on said recording medium, and control logic circuit means including enabling circuit means responsive to a first preselected one of the code words provided by said digital clock means to enable said code words to be extended to said signal generating means during recording intervals to thereby permit said time of day and said calendar date information to be recorded on said recording medium, and inhibit circuit means responsive to a second preselected one of the code words provided by said digital clock means to prevent said code words from being extended to said signal generating means between two consecutive recording intervals.

31. In a multitrack data recording apparatus having at least first and second recording head means, and event data recording means for providing drive signals for said first recording head means to effect the recording of event data provided by a data source on one track of a magnetic tape, a time reference recording means for recording a time reference for said event data on said tape, said time recording means comprising time reference data source means including digital clock means operable in a first mode to provide code words representing time information, said digital clock means being operable in second mode to provide code words representing date information, each of said code words comprising a multibit word which is provided at parallel outputs of said digital clock means, timing control means for providing timing signals for controlling said digital clock means to select the operating mode for said digital clock means, and output means controlled by said timing control means to receive the multibit code words provided by said digital clock means in a predetermined sequence, said output means including phase encoder means operable when enabled to respond to the bits of said code words to provide phase encoded drive signals representing said code words, and parallel-to-serial converter means responsive to further timing signals provided by said timing control means to extend the bits of each code word to said phase encoder means in sequence as each code word is provided, enabling said phase encoder means to provide said phase encoded drive signals for one of said recording head means to effect the recording of said time and date information on one of the tracks of said magnetic tape.

* * * * *

UNITED STATES PATENT AND TRADEMARK OFFICE
CERTIFICATE OF CORRECTION

PATENT NO. : 4,122,498
DATED : October 24, 1978
INVENTOR(S) : Robert E. Dyer

It is certified that error appears in the above-identified patent and that said Letters Patent are hereby corrected as shown below:

Column 23, line 39, "data" should be -- date --;

Column 23, line 51, "data" should be -- date --;

Column 25, line 12, "data" should be -- date --;

Column 26, line 22, "timme" should be -- time --;

Signed and Sealed this

Sixth Day of February 1979

[SEAL]

Attest:

RUTH C. MASON
Attesting Officer

DONALD W. BANNER
Commissioner of Patents and Trademarks